United States Patent [19]

Fang

[11] 4,028,309

[45] June 7, 1977

[54] COATING COMPOSITIONS CONTAINING ESTERS OF DIBASIC ACIDS, GLYCOLS AND GLYCIDYL ESTERS, AND POLYISOCYANATES

[75] Inventor: James C. Fang, Media, Pa.

[73] Assignee: E. I. Du Pont de Nemours and Company, Wilmington, Del.

[22] Filed: July 31, 1975

[21] Appl. No.: 600,848

Related U.S. Application Data

[63] Continuation-in-part of Ser. No. 557,579, March 12, 1975, abandoned, which is a continuation of Ser. No. 369,175, June 12, 1973, abandoned.

[52] U.S. Cl. .............. 260/77.5 AN; 260/77.5 AT; 260/77.5 TB
[51] Int. Cl.² .............. C08G 18/42; C08G 18/62; C08G 18/80
[58] Field of Search .............. 260/77.5 AN, 75 NK

[56] References Cited

UNITED STATES PATENTS

| | | | |
|---|---|---|---|
| 2,982,754 | 5/1961 | Sheffer et.al. | 260/33.4 |
| 3,341,498 | 9/1967 | Skreckoshi et al. | 260/75 NK |
| 3,455,886 | 7/1969 | Versnel | 260/77.5 AN |
| 3,901,858 | 8/1975 | Sugiyama et al. | 260/80.72 |
| 3,928,420 | 12/1975 | Fang | 260/77.5 AN |

Primary Examiner—H.S. Cockeram

[57] ABSTRACT

Diesters and triesters of dibasic acids, glycols, triols, and glycidyl esters, when formulated with polyfunctional isocyanates, form coating compositions which require little or no organic liquid carrier. These compositions air-dry or cure at low temperatures, and give off little or no organic liquid on drying or curing, thereby conforming to most anti-pollution legislation and saving fuel.

17 Claims, No Drawings

COATING COMPOSITIONS CONTAINING ESTERS OF DIBASIC ACIDS, GLYCOLS AND GLYCIDYL ESTERS, AND POLYISOCYANATES

This application is a continuation-in-part of Ser. No. 557,579, filed Mar. 12, 1975, now abandoned, which is a continuation of Ser. No. 369,175, filed June 12, 1973, now abandoned.

BACKGROUND OF THE INVENTION

There has been much emphasis in recent years on developing coating compositions which do not pollute the atmosphere as they dry. This has become increasingly important with the passage of legislation strictly limiting the amount and kinds of organic liquids that can be emitted during industrial finishing operations.

The compositions of this invention require little or no organic liquid carrier to bring them to application viscosity. This places them in the forefront of technology, for they emit a minimum of volatiles into the air as they cure, thus conforming to most anti-pollution legislation. In addition, these compositions either air-dry or cure at unusually low temperatures, thus cutting fuel costs.

The compositions' low carrier content also carries with it additional benefits. Since the compositions contain a high level of solids, the saving in shipping costs is considerable. Their high solids content also makes it possible, in spray applications, to apply more of the compositions per pass of the spray gun, thereby saving much in labor costs.

The compositions of this invention also have the advantage of being compatible with most conventional mill bases used in the paint industry.

In addition, when cured, these compositions give hard, durable, glossy, flexible finishes with excellent adhesion to unprimed metal.

All these properties suit them for use in topcoating automobiles, for finishing appliances, metal furniture, wood and plastics, and for coil coating operations.

SUMMARY OF THE INVENTION

The compositions of this invention have in them two basic components—a diester or triester and a polyfunctional isocyanate.

The diester and triester are represented by the structural formulae (1) or (2) wherein for the diester $a=b=1$ and $c=2$; for the triester, $a$ and $b$ are 1 or 2 but $a+b=3$ and $c=3$:

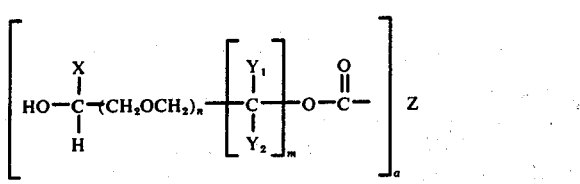

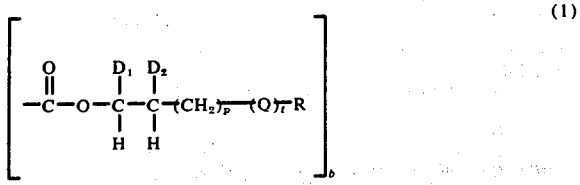
(1)

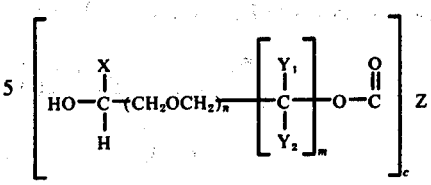
(2)

where, in either structure,

X is hydrogen, an alkyl radical of 1–4 carbon atoms or phenyl;

$Y_1$ and $Y_2$ can be the same or different and are hydrogen, —$CH_2OH$ or an alkyl radical of 1–4 carbon atoms:

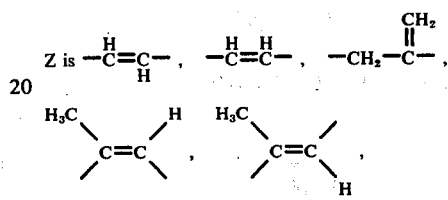

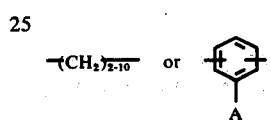

where

A is hydrogen or —COOH for the diester and a valence bond for the triester;

$D_1$ is hydrogen or —$CH_2OH$;

$D_2$ is hydrogen or —OH, provided that one and only one of $D_1$ or $D_2$ must be —OH or —$CH_2OH$;

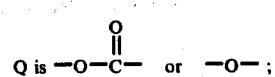

R is an alkyl radical of 4–18 carbon atoms, or a singly, doubly or triply unsaturated hydrocarbon radical of 17 carbon atoms;

$n$ is 0 or 1;

$m$ is 1–5;

$p$ is 0 or 1; and $t$ is 0 or 1.

Mixtures of these diesters can also be used.

Among the preferred formula (1) diester are included those where:

a. X is hydrogen, $n$ is 0, $m$ is 1, $Y_1$ and $Y_2$ are hydrogen, and Z is an unsaturated radical (as already described);

b. X is hydrogen, $n$ is 0, $m$ is 1, $Y_1$ is —$CH_3$, $Y_2$ is hydrogen, and Z is an unsaturated radical (as already described);

c. X is hydrogen, $n$ is 0, $m$ is 2, $Y_1$ and $Y_2$ are (1) hydrogen and —OH and (2) hydrogen and hydrogen, and Z is an unsaturated radical (as already described); and for each of (a), (b) and (c) $D_1$ is hydrogen, $D_2$ is —OH, $p$ is 1,

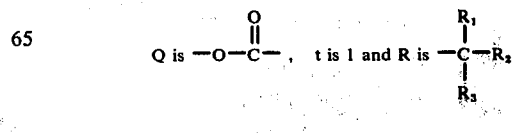

where $R_1$ is —$CH_3$ and $R_2$ and $R_3$ are lower alkyl, the total number of carbon atoms in $R_1$, $R_2$, and $R_3$ being 7–11.

One preferred diester is:

The preferred formula (2) diesters can be described in the same way as the formula (1) preferred diesters, except that Z in each case is:

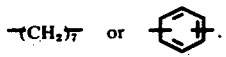

For either formula (1) or (2) triester

Z is 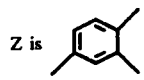

(i.e. based on trimellitic acid or anhydride). The preferred triesters can be described in the same way as the preferred diesters.

The isocyanate used in the composition of this invention can be any aromatic or aliphatic polyfunctional isocyanate capable of reacting with the esters to form a crosslinked network. Illustrative of such an isocyanate are: toluene diisocyanate,

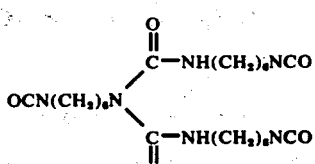

(known as "Desmodur N"),

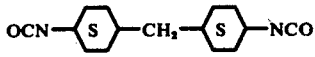

(known as Hylene W, a registered trademark of the E. I. du Pont de Nemours and Co.),

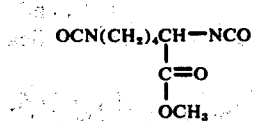

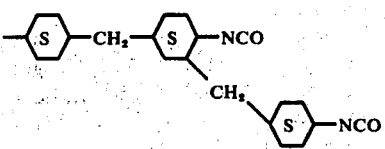

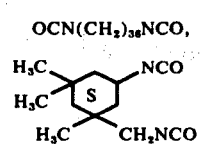

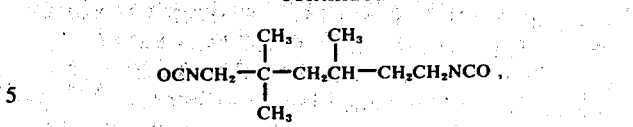

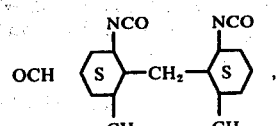

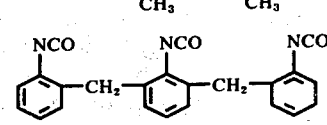

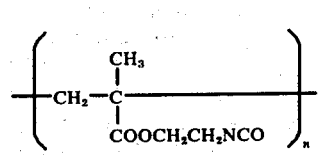

where n is 2–100, and

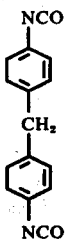

Mixtures of isocyanates can also be used.

Most of the polyfunctional isocyanates are available in the marketplace. Those which are not can be made by any of the methods well-known in the art. The isocyanates preferred are:

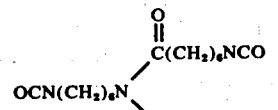

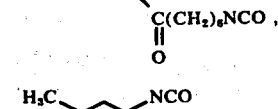

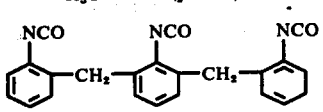

Preparation of the Diesters and Triesters

The diesters of formula (1) are prepared by first reacting about 1 mole of a suitable dibasic acid with about 1 mole of a suitable polyol according to the illustrative equation:

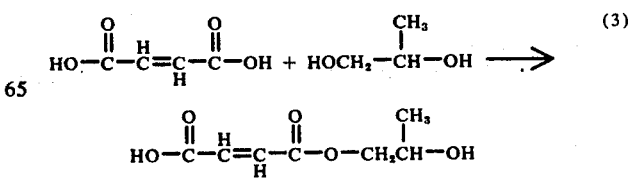

The reaction is catalyzed with about 0.25%, by weight, of toluenesulfonic acid, phosphoric acid, tetrapropyl titanate or dibutyltin oxide. There is also added about 0.05%, by weight, of an addition polymerization inhibitor such as p-methoxyphenol or hydroquinone.

The acid and glycol are mixed and held at 135°–146° C, under nitrogen, until about 1 mole of water has been given off. In the usual case this takes about 45 minutes to 1 hour.

About 1 mole of the resulting intermediate is then reacted with 0.4–1.0 mole of a glycidyl ester, a glycidyl ether or an alkylene oxide, according to the illustrative equation:

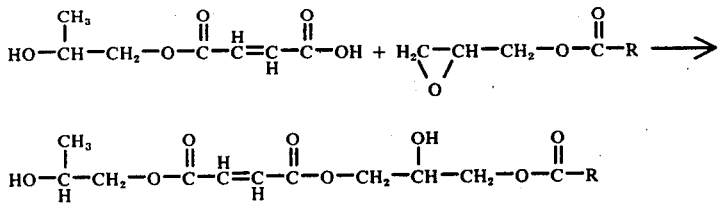

where R is as in formula (1).

The intermediate half-ester, produced by equation (3), and the glycidyl ester are mixed and heated to 180°–200° C, under nitrogen, and held at that temperature for about 1 hour. Preparation of the diester is then complete.

The dibasic unsaturated acids used in this process are fumaric, maleic, itaconic, citraconic, and mesaconic. Maleic anhydride can also be used.

Illustrative of polyols which can be used are ethylene glycol, 1,2-propanediol, 1,3-propanediol, 1,4-butanediol, 1,5-pentanediol, glycerol, 1,2,3-butanetriol, 1,2,3,4-butanetetraol, 1,6-hexanediol, neopentyl glycol, diethylene glycol, trimethylolpropane, and 2,2,4-trimethylpentane-1,3-diol. Preferred are ethylene glycol, 1,2-propanediol or glycerol.

Illustrative of the glycidyl compounds which can be used are esters of glycidol with monobasic acids of 4–18 carbon atoms, such as glycidyl palmitate, glycidyl laurate, and glycidyl stearate; alkylene oxides of 4–18 carbon atoms such as butylene oxide; and glycidyl ethers such as octyl glycidyl ether.

When R in formula (1) is an unsaturated hydrocarbon radical, the glycidyl ester reactant used is represented by the structure

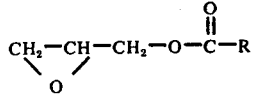

where R is a singly, doubly or triply unsaturated hydrocarbon radical of 17 carbon atoms.

This ester can be prepared by the reaction of a suitable soap with epichlorohydrin. When the soap is derived from a naturally occurring oil such as linseed oil, soya oil, safflower oil, tall oil, or chinawood oil, the glycidyl ester, and the final product it gives, is a mixture of compounds whose R groups vary from each other, the variance depending on the nature of the oil.

Especially preferred is a mixed glycidyl ester known as "Cardura E" ester (available from Shell Chemical Company), which is represented by the structure

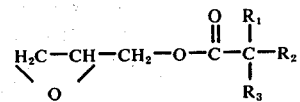

where $R_1$ is $-CH_3$ and $R_2$ and $R_3$ are lower alkyl, the total number of carbon atoms in $R_1$, $R_2$ and $R_3$ being 7–11.

It will be apparent from the foregoing equations that small amounts of isomers of the diesters shown will be formed. For example, when maleic acid is used, the diester will partially isomerize to the trans form (fumaric acid).

In addition, the intermediate half-ester, for the most part, opens the cyclic ether ring by reaction with the carboxyl group, as shown in equation (4). However, some rupturing is brought about by reaction with the hydroxyl group on the intermediate. This isomeric form is not represented by formula (1) because such small quantities are produced.

Similarly, the alkyl groups of X, $Y_1$, and $Y_2$ in formula (1) can vary in position according to which hydroxyl group of an unsymmetrical diol or triol is attacked by the acid when the two are reacted as shown in equation (3).

These isomeric forms can be isolated from the main product by chromatographic techniques if desired. However, isolation is unnecessary because all of the isomers are useful for the purposes already described. Indeed, the presence of these isomeric forms in some cases makes the compositions compatible with a wider variety of film-formers and lowers their viscosity. It is, therefore, preferred and recommended that the various isomers not be isolated.

In preparing the diesters, one may use mixtures of acids, of diol, triol, and of glycidyl compounds if one wishes to obtain a balance of properties. Suitable mixtures and the proportions of their components will be immediately apparent to anyone versed in the polymer or paint art.

The diesters of formula (2) are prepared by reacting a suitable saturated dibasic acid with an appropriate polyol according to the illustrative equation $$HOOC(CH_2)_7COOH + 2\ HOCH_2-\underset{\underset{CH_3}{|}}{C}H-OH \longrightarrow$$

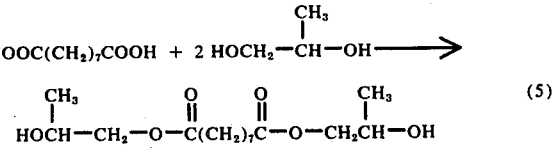

(5)

The acid and the glycol are placed in a vessel, together with about 5%, by weight, of toluene and about 0.1%, by weight, of p-toluenesulfonic acid. This mixture is held at 140°–160° C, with stirring, until about two equivalent weights of water have been removed by azeotropic distillation. The diester is then ready for use.

Illustrative of the dibasic saturated acids used are azelaic, sebacic, adipic, dodecandioic, and phthalic (all isomers). Preferred are azelaic acid and phthalic anhydride.

The polyols used are the same as those listed for preparation of the formula (1) esters.

Triesters of either formula (1) or (2) are prepared as described above, using trimellitic anhydride.

Preparation of the Coating Compositions

The coating composition of this invention is prepared by bringing together suitable amounts of an ester of either formula (1) or formula (2), or a mixture of these esters, and a polyfunctional isocyanate. Sufficient polyfunctional isocyanate, to provide about 0.8–1.2 equivalent weights of isocyanate radical for each hydroxyl radical on the ester, is used. There can also be added to this mixture about 0.02–1%, preferably about 1%, by weight, of a hydroxyl-isocyanate reaction accelerator such as tin octoate or dibutyltin dilaurate.

If it appears desirable to have a pigmented composition, pigment can be added by way of a mill-base, conventionally prepared, using as a vehicle an ester of formula (1) or (2), an acrylic resin bearing hydroxyl groups, or a non-drying oil alkyd resin.

Adjuncts such as coalescing aids, flow agents, lubricants, and the like are ordinarily not needed, but such things can be used in the usual amounts if their presence appears desirable.

In all steps of preparing the esters of formula (1) or formula (2), and in the preparation of the coating composition itself, it is important to keep out water, for its presence will cause premature curing and gelation.

Because the ester and the isocyanate can react rapidly, the coating composition, in practice, is a system of two separate entities or packages, the first comprising the ester, the accelerator, and whatever pigments and adjuncts are used, and the second the isocyanate. These entities are brought together in the proper ratio just before the composition is to be used. Some compositions, however, have sufficient stability for as long as 24 hours.

If one wishes to prepare a one-package system, the polyfunctional isocyanate can be replaced with a molar equivalent amount of a phenol- or ketoxime blocked isocyanate, or mixture of blocked isocyanates.

Application

The compositions of this invention, whether a one-package or a two-package system, should be at a viscosity of approximately 1–2 poise at 25° C for proper application. Some of the compositions have this viscosity inherently; those which do not can be brought to this viscosity by the addition of mono-ethyl ether of ethylene glycol, toluene or any other such compatible nonreactive solvent, or by heating the composition to about 55° C.

The composition can then be applied by any of the conventional techniques. Spraying, brushing, dipping, roller-coating, or flow-coating can be used, although spraying is the method most often used.

The thickness to which the composition is applied is largely a matter of choice, but it is possible in most cases to apply somewhat thicker coats than is the rule with conventional compositions without the usual accompanying sagging and running.

The composition, however it is applied, is then cured by air-drying for about 4 hours or by baking it for 2–40 minutes at 120°–260° C, the lesser times of course requiring higher temperatures.

The composition can be used primarily to coat metal, primed or unprimed, but the unusually low cure temperatures or short cure times required make it possible to coat things like plastic, which do not ordinarily withstand the baking temperatures needed with conventional compositions.

In the examples illustrating the invention, all parts are by weight.

EXAMPLE 1

A. Into a reaction vessel were charged, with mixing, phthalic anhydride, 296 parts and propylene glycol, 152 parts. The mixture was brought to a temperature of 140° C and held there for 10 minutes. 400 parts of "Cardura E" was added slowly, with stirring, and the temperature was then raised to 160°–180° C and held there for 1 hour. The product was a clear yellow liquid, containing mainly a diester described by formula (1).

B. A coating composition was prepared by mixing together:

| | | |
|---|---|---|
| product of (A) | 98 | parts |
| "Desmodur N" solution (32% in xylene/Cellosolve acetate 1/1) | 213.5 | " |
| mill base - blue (made by conventional alkyd mill base technology) | 25 | " |
| mill base - metallic (made by conventional alkyd mill base technology) | 7 | " |
| dibutyltin dilaurate | 5 | " |

This mixture was filtered through cheesecloth and sprayed to a glass plate to a thickness of 1–2 mils (dry). The plate was then baked for 40 minutes at 120° C to give a glossy, hard finish.

EXAMPLE 2

A. Into a reaction vessel were charged, with mixing, glycerol, 460 parts and maleic anhydride, 490 parts. The mixture was brought to a temperature of 155° C and 50 drops of tin dioctoate was added. The mixture was then held at 145°–156° C while 1200 parts of "Cardura E" was added over a ten-minute period. The mixture was then held for another hour to give a viscous amber product, having a structure shown by formula (1).

B. A coating composition was prepared by mixing together:

| | | |
|---|---|---|
| product of (A) | 60 | parts |
| "Desmodur N" solution (of Example 1 (B)) | 90 | " |
| dibutyltin dilaurate | 3 | " |

This composition was sprayed to an aluminum panel to a thickness of 1–2 mils (dry). The panel was then baked for 30 minutes at 120° C to give a hard, glossy, flexible finish.

EXAMPLE 3

A. Into a reaction vessel were charged, with mixing:

| | | |
|---|---|---|
| propylene glycol | 1520 | parts |
| azelaic acid | 1880 | " |
| toluene | 500 | " |
| toluene sulfonic acid | 2 | " |

This mixture was held at 112°–137° C for 8 hours, with stirring, while 360 parts of an azeotrope was distilled. To this was then added a further 150 parts of propylene glycol. This mixture was then held for 252 minutes at 140°–144° C, with stirring, while 428 parts of azeotrope was distilled.

Methylethyl ketone, 216 parts, was then added and the mixture held for 215 minutes at 131°–138° C, with stirring, while 27 parts of azeotrope was distilled.

The resulting product was a clear, pale yellow fluid of low viscosity, having a structure described by formula (2).

B. A coating composition was prepared by mixing together:

| | | |
|---|---|---|
| product of (A) | 20 | parts |
| "Desmodur N"-75 (75% solution in xylene/cellosolve acetate 1/1) | 20 | " |

This composition was doctor-bladed on an aluminum panel. The panel was baked for 30 minutes at 120° C to give a flexible, hard finish.

EXAMPLE 4

A coating composition was prepared by mixing together:

| | | |
|---|---|---|
| product of Example 3(A) | 20 | parts |
| ketoxime blocked isocyanate, based on "Hylene-W" | 20 | " |

This composition was drawn on an aluminum panel. The panel was then baked for 10 minutes at 180° C to give a hard, glossy, clear coating.

I claim:
1. A composition comprising the reaction product of
A. a compound selected from the group consisting of:

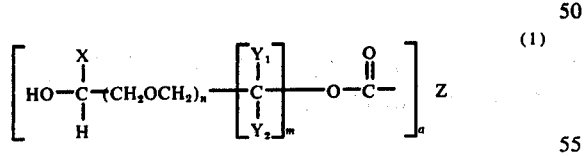

(1)

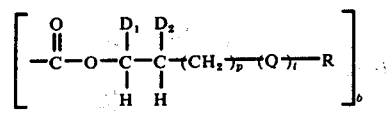

and

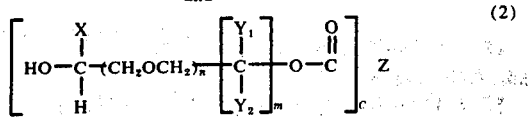

(2)

where, in either structure,

X is hydrogen, an alkyl radical of 1–4 carbon atoms or phenyl;
$Y_1$ and $Y_2$ can be the same or different and are hydrogen, —$CH_2OH$ or an alkyl radical of 1–4 carbon atoms;

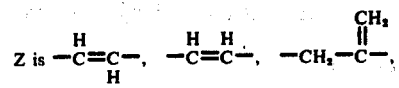

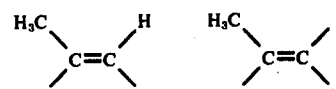

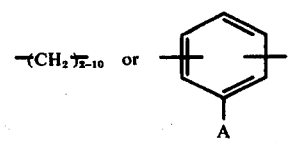

where A is hydrogen or —COOH for the diester and a valence bond for the triester;
$D_1$ is hydrogen or —$CH_2OH$;
$D_2$ is hydrogen or —OH provided that one and only one of $D_1$ or $D_2$ must be —OH or —$CH_2OH$;

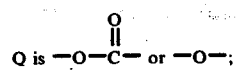

R is an alkyl radical of 4–18 carbon atoms, or a singly, doubly or triply unsaturated hydrocarbon radical of 17 carbon atoms;
$a$ and $b$ and 1 or 2, provided that $a + b$ is 2 or 3;
$c$ is 2 or 3;
$n$ is 0 or 1;
$m$ is 1–5;
$p$ is 0 or 1; and
$t$ is 0 or 1;
and
B. a polyfunctional isocyanate.
2. The composition of claim 1 where, in formula (1),
X is hydrogen;
$a$ and $b$ are 1;
$n$ is 0,
$m$ is 1,
$Y_1$ and $Y_2$ are hydrogen;
$D_1$ is hydrogen;
$D_2$ is —OH;
$p$ is 1;

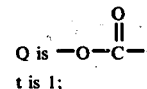

$t$ is 1;

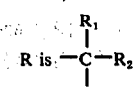

where $R_1$ is —$CH_3$ and $R_2$ and $R_3$ are lower alkyl, the total number of carbon atoms in $R_1$, $R_2$ and $R_3$ being 7–11;
and Z is $-(CH_2)_7-$ or 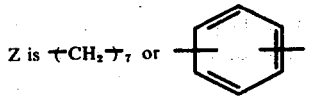

3. The composition of claim 1 wherein, in formula (1),
X is hydrogen;
a and b are 1;
n is 0;
m is 1;
$Y_1$ is $-CH_3$;
$Y_2$ is hydrogen;
$D_1$ is hydrogen;
$D_2$ is $-OH$;
p is 1;

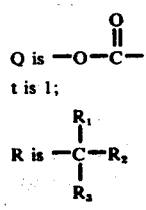

t is 1;

R is $-\underset{\underset{R_3}{|}}{\overset{\overset{R_1}{|}}{C}}-R_2$ where $R_1$ is $-CH_3$ and $R_2$ and $R_3$ are lower alkyl, the total number of carbon atoms in $R_1$, $R_2$ and $R_3$ being 7-11;
and Z is $-(CH_2)_7-$ or 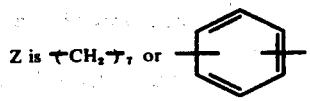

4. The composition of claim 1 where, in formula (1),
X is hydrogen;
n is 0;
m is 2;
$Y_1$ and $Y_2$ are (1) hydrogen and $-OH$ and (2) hydrogen and hydrogen;
$D_1$ is hydrogen;
$D_2$ is $-OH$;
p is 1;

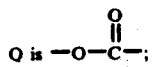

t is 1;
a and b are 1;

R is $-\underset{\underset{R_3}{|}}{\overset{\overset{R_1}{|}}{C}}-R_2$ where $R_1$ is $-CH_3$ and $R_2$ and $R_3$ are lower alkyl, the total number of carbon atoms in $R_1$, $R_2$ and $R_3$ being 7-11;
and Z is $-(CH_2)_7-$ or 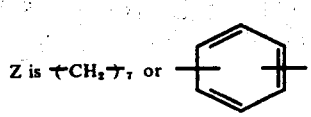

5. The composition of claim 1 wherein a and b are 1 or 2, provided that a + b is 3, c is 3, and

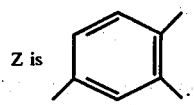

6. The composition of claim 1 wherein the polyfunctional isocyanate is

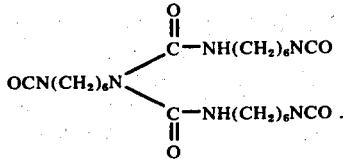

7. The composition of claim 2 wherein the polyfunctional isocyanate is

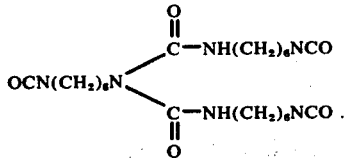

8. The composition of claim 3 wherein the polyfunctional isocyanate is

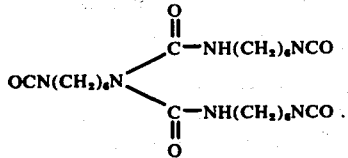

9. The composition of claim 4 wherein the polyfunctional isocyanate is

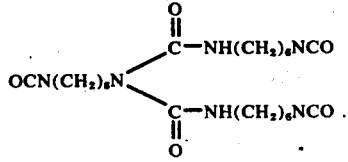

10. The composition of claim 5 wherein the polyfunctional isocyanate is

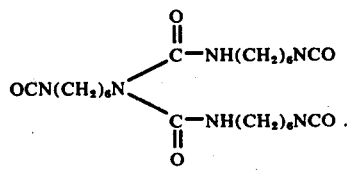

11. An article coated with a cured film of the composition of claim 1.
12. An article coated with a cured film of the composition of claim 2.
13. An article coated with a cured film of the composition of claim 3.

14. An article coated with a cured film of the composition of claim 4.

15. An article coated with a cured film of the composition of claim 5.

16. The composition of claim 1 wherein the polyfunctional isocyanate is a blocked isocyanate.

17. A curable composition comprising

A. a compound selected from the group consisting of:

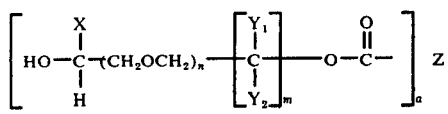  (1)

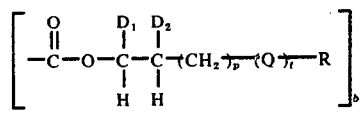

and

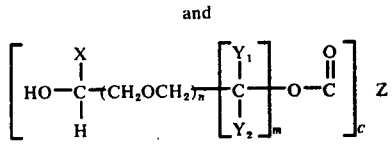  (2)

where, in either structure,

X is hydrogen, an alkyl radical of 1–4 carbon atoms or phenyl;

$Y_1$ and $Y_2$ can be the same or different and are hydrogen, —$CH_2OH$ or an alkyl radical of 1–4 carbon atoms;

Z is 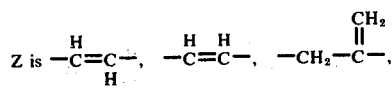

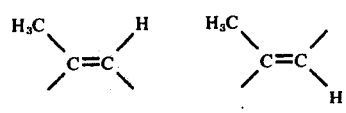

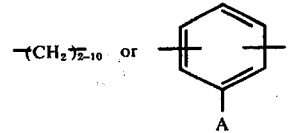

where A is hydrogen or —COOH for the diester and a valence bond for the triester;

$D_1$ is hydrogen or —$CH_2OH$;

$D_2$ is hydrogen or —OH provided that one and only one of $D_1$ or $D_2$ must be —OH or —$CH_2OH$;

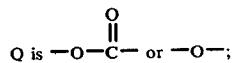

R is an alkyl radical of 4–18 carbon atoms, or a singly, doubly or triply unsaturated hydrocarbon radical of 17 carbon atoms;

$a$ and $b$ are 1 or 2, provided that $a + b$ is 2 or 3;

$c$ is 2 or 3;

$n$ is 0 or 1;

$m$ is 1–5;

$p$ is 0 or 1; and $t$ is 0 or 1;

and

B. a polyfunctional isocyanate, brought into form for use by mixing (A) with (B).

* * * * *